Patented Nov. 14, 1933

1,934,804

UNITED STATES PATENT OFFICE 1,934,804

SEED DISINFECTANT

Morris S. Kharasch, Chicago, Ill., assignor to E. I. du Pont de Nemours & Company, Wilmington, Del., a corporation of Delaware No Drawing. Application May 26, 1930
Serial No. 455,963

11 Claims. (Cl. 167—38)

This invention relates to disinfectants for the treatment of seed and plant diseases, and more particularly to a new type of mercury compounds for this purpose, which may be represented by the formula R—Hg—OH, where R is an unsubstituted hydrocarbon radicle.

This application is a continuation in part of my copending application, Serial No. 199,407, filed June 16, 1927.

In my said copending application I have disclosed disinfectant compositions including the alkyl and aryl mercury salts.

I have also found that the hydroxides, either in the wet or dry form are particularly effective when used in combination with inert ingredients alone or in combination with other fungicides, such for example as Bordeaux mixture, or insecticides such as nicotine salts, arsenicals, etc.

In order to further illustrate my invention and without limiting it in any way thereto, the following examples are given:

Example 1

Methyl mercury hydroxide is combined with an inert ingredient, such as talc, diatomaceous earth, chalk, or hydrated lime, or a mixture of two of the aforementioned inert ingredients in proportion of approximately two (2) parts of the hydroxide to 98 parts of the inert material. The product may then be dusted on the seeds or plants.

Example 2

Phenyl mercury hydroxide is intimately combined with the inert ingredients of Example 1 in the proportion of approximately three (3) parts of the acetate to 97 parts of the inert material.

Example 3

Ethyl mercury hydroxide may be prepared in a similar manner to the composition of foregoing Example 1.

Solutions prepared in the proportion of approximately one (1) part ethyl mercuric hydrate to 5000 parts of liquid diluent will be found effective in killing fungus spores in approximately fifteen seconds.

These compositions have been found particularly effective in the treatment of smut diseases of grain, and bacteriosis of peaches and plums, "brown patch" of grass turf caused by *Rhizoctonia solani*, black rot of grapes, late blight of potatoes, etc.

In making up sprays containing these mercury compounds it is of advantage to add spreaders or stickers, such as soap, casein, sodium silicate, etc., wetting agents to cause the spray to readily wet the foliage, and colloidal or non-colloidal diluents such as bentonite, clay, infusorial earth, talc, hydrated lime, etc.

As many apparently widely different embodiments of this invention may be made without departing from the spirit thereof, it is to be understood that I do not limit myself to the foregoing examples or descriptions except as indicated in the following patent claims.

I claim:

1. A disinfectant and spray for the control of seed and plant diseases, comprising a mercury compound of the type R—Hg—OH, where R is a hydrocarbon radicle.

2. A disinfectant and spray for the control of seed and plant diseases comprising a mercury compound of the type R—Hg—OH, where R is an alkyl radicle.

3. A disinfectant and spray for the control of seed and plant diseases comprising a mercury compound of the type R—Hg—OH, where R is an aryl radicle.

4. A disinfectant and spray for the control of seed and plant diseases comprising a mercury compound of the type R—Hg—OH, where R is a radicle taken from a group consisting of methyl, ethyl, propyl, phenyl, tolyl, and benzyl.

5. A disinfectant and spray for the control of seed and plant diseases comprising an alkyl mercury hydroxide and a diluting agent.

6. A seed and plant disinfectant comprising ethyl mercuric hydroxide.

7. The process of disinfecting and treating seeds and plants which comprises applying thereto a mercury compound of the type R—Hg—OH, in which R is a hydrocarbon radical.

8. The process of disinfecting and treating seeds and plants which comprises applying thereto a mercury compound of the type R—Hg—OH, in which R is an alkyl radicle.

9. The process of disinfecting and treating seeds and plants which comprises applying thereto a mercury compound of the type R—Hg—OH, in which R is an aryl radicle.

10. The process of disinfecting and treating seeds and plants which comprises applying thereto a mercury compound of the type R—Hg—OH, in which R is a radical taken from a group consisting of methyl, ethyl, propyl, phenyl, tolyl and benzyl compounds.

11. The process of disinfecting and treating seeds and plants which comprises applying thereto an alkyl mercury hydroxide and a diluting agent.

MORRIS S. KHARASCH.